United States Patent
Ummiti et al.

(10) Patent No.: US 12,448,937 B1
(45) Date of Patent: Oct. 21, 2025

(54) SYSTEM AND METHOD FOR OPERATING EXHAUST GAS RECIRCULATION IN GAS TURBINES

(71) Applicant: GE Infrastructure Technology LLC, Greenville, SC (US)

(72) Inventors: Muneeswara Babu Ummiti, Bengaluru (IN); Stephen Kent Fulcher, Greenville, SC (US); Aysegül Kirecci, Baden (CH); Karthik Yamajala, Hyderabad (IN); Anantha Ramesh, Bengaluru (IN); Gregory Hespe, Baden (CH); Todd Franklin Denman, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/742,237

(22) Filed: Jun. 13, 2024

(51) Int. Cl.
*F02M 26/34* (2016.01)
*F02C 3/04* (2006.01)
*F02C 3/34* (2006.01)
*F02M 26/04* (2016.01)
*F02M 26/06* (2016.01)
*F02M 26/14* (2016.01)
(Continued)

(52) U.S. Cl.
CPC .............. *F02M 26/34* (2016.02); *F02C 3/04* (2013.01); *F02C 3/34* (2013.01); *F02M 26/04* (2016.02); *F02M 26/06* (2016.02); *F02M 26/14* (2016.02); *F02M 26/47* (2016.02); *F02M 2026/003* (2016.02); *F02M 2026/004* (2016.02)

(58) Field of Classification Search
CPC ........ F02M 26/04; F02M 26/06; F02M 26/14; F02M 26/34; F02M 26/47; F02M 2026/003; F02M 2026/004; F02C 3/04; F02C 3/34
See application file for complete search history.

(56) References Cited

U.S. PATENT DOCUMENTS 4,204,401 A * 5/1980 Earnest .................... F02C 3/34
60/773
6,256,976 B1 * 7/2001 Kataoka ................... F02C 7/08
60/39.52
(Continued)

FOREIGN PATENT DOCUMENTS

AU 2017261468 B2 2/2020

*Primary Examiner* — Audrey B. Walter
(74) *Attorney, Agent, or Firm* — Dority & Manning, P.A.

(57) ABSTRACT

A system including a gas turbine system including a compressor configured to compress an oxidant; a combustor configured to receive and combust a fuel; a turbine driven by combustion products from the combustor; an exhaust gas recirculation system configured to recirculate exhaust gas along an exhaust recirculation path; and an inlet sensor adjacent to the inlet of the compressor, the inlet sensor detects one or more characteristics; a generator driven by the turbine, wherein the generator generates electrical power and exports to an electrical grid; and a control system including: one or more dampers along the exhaust recirculation path and actuatable between open and closed positions; and a controller configured to receive sensor data, the sensor data associated with a characteristic at the inlet; and modulate at least one of the dampers based on the received sensor data to control an amount of exhaust gas injected into the compressor.

18 Claims, 5 Drawing Sheets

(51) Int. Cl.
*F02M 26/47* (2016.01)
*F02M 26/00* (2016.01)

(56) References Cited

U.S. PATENT DOCUMENTS

| | | | |
|---|---|---|---|
| 8,051,638 B2 * | 11/2011 | Aljabari | F02C 1/08 60/773 |
| 8,408,006 B2 | 4/2013 | Li et al. | |
| 9,599,070 B2 | 3/2017 | Huntington et al. | |
| 10,727,768 B2 | 7/2020 | Huntington et al. | |
| 2018/0135569 A1 * | 5/2018 | Han | F02M 26/46 |

* cited by examiner

SYSTEM AND METHOD FOR OPERATING EXHAUST GAS RECIRCULATION IN GAS TURBINES

FIELD

The present disclosure relates generally to gas turbine systems and, more specifically, to gas turbine driven power plants.

BACKGROUND

Gas turbine engines are used in a wide variety of applications, such as power generation, aircraft, and various machinery. Gas turbine engines generally combust fuel with an oxidant (e.g., air) in a combustor section to generate hot combustion products, which then drive one or more turbine stages of a turbine section. In turn, the turbine section drives one or more compressor stages of a compressor section, thereby compressing oxidant for intake into the combustor section along with the fuel. Additional fuel and oxidant mix in the combustor section, and then combust to produce the hot combustion products. These combustion products may include unburnt fuel, residual oxidant, and various emissions (e.g., nitrogen oxides) depending on the condition of combustion. Furthermore, gas turbine engines typically consume a vast amount of air as the oxidant, and output a considerable amount of exhaust gas into the atmosphere. In other words, the exhaust gas is typically wasted as a byproduct of the gas turbine operation.

Accordingly, improved systems and methods of recirculating exhaust gases are desired in the art. In particular, systems and methods which productively utilize recirculated exhaust gases to improve combustion operability and load efficiency would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a system is provided. The system includes a gas turbine system comprising: a compressor configured to compress and supply the oxidant to the combustor; a combustor configured to receive and combust a fuel with an oxidant; a turbine driven by combustion products from the combustor; an exhaust gas recirculation (EGR) system configured to recirculate the exhaust gas along an exhaust recirculation path from the turbine to an inlet of the compressor; and an inlet sensor disposed adjacent to the inlet of the compressor, the inlet sensor configured to detect one or more characteristics at the inlet; a generator driven by the turbine, wherein the generator is configured to generate electrical power and export a portion of the electrical power to an electrical grid; and a control system comprising: one or more dampers disposed along the exhaust recirculation path and actuatable between open and closed positions; and a controller in communication with the inlet sensor and configured to: receive sensor data associated with a sensed one or more characteristics detected at the inlet; and cause actuation of at least one of the one or more dampers based on the received sensor data to control a temperature at the inlet of the compressor.

In accordance with another embodiment, a non-transitory computer-readable medium storing instructions which, when executed, causes performance of a method of modulating an exhaust gas recirculation (EGR) system to inject exhaust gas into an inlet of a compressor of a gas turbine system is provided. The non-transitory computer-readable medium storing instructions which, when executed, causes performance of a method of modulating an exhaust gas recirculation (EGR) system to inject exhaust gas into an inlet of a compressor of a gas turbine system includes receiving, at a controller of the gas turbine system, sensor data from an inlet sensor, the sensor data including one or more of: a temperature, a humidity, a flow rate, or a pressure of fluid at the inlet; processing, by a processor of the controller, the sensor data received from the inlet sensor to determine a current operating characteristic at the inlet; determining, by the processor, an EGR injection capacity based on the current operating characteristic at the inlet, the EGR injection capacity defining a maximum injectable amount of the exhaust gas from the EGR system into the inlet of the compressor; and controlling, by the processor, one or more dampers associated with the EGR system to modulate an amount of the exhaust gas injected into the inlet based on the determined EGR injection capacity.

In accordance with another embodiment, a method of modulating exhaust gas from an exhaust gas recirculation (EGR) system to heat airflow at an inlet of a compressor of a gas turbine system is provided. The method of modulating exhaust gas from an exhaust gas recirculation (EGR) system to heat airflow at an inlet of a compressor of a gas turbine system includes determining an EGR injection capacity for an inlet of a compressor of a gas turbine system based on a sensed operating characteristic of airflow at the inlet, the EGR injection capacity defining a maximum injectable amount of an exhaust gas from an EGR system of the gas turbine system into the inlet of the compressor while maintaining at least a threshold oxidant level at the inlet; and modulating one or more dampers of the EGR system based on the determined EGR injection capacity to maximize a temperature at the inlet of the compressor while maintaining a part load efficiency within a part load operating threshold and maintaining a base load efficiency within a base load operating threshold.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
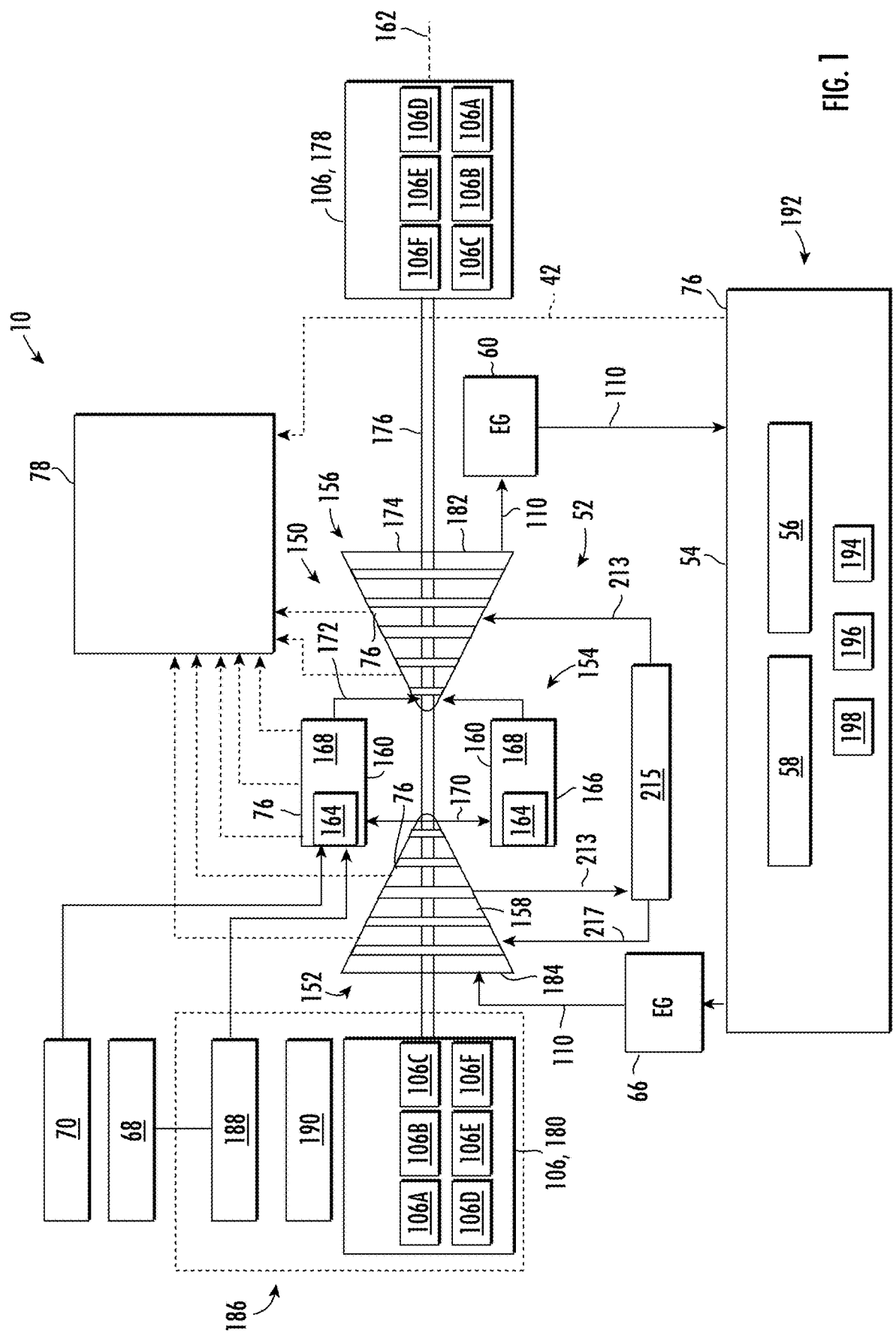
FIG. 1 is a schematic view of a system including a gas turbine system in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, systems and methods described herein are intended to increase operating (system) efficiency of gas turbine engines. Systems and methods described herein utilize injection of recycled hot exhaust gas at an inlet of the gas turbine compressor to affect control of the gas turbine engine. Through feedback control and modulation of the exhaust gas injected at the inlet of the gas turbine engine, the systems and methods described herein can maintain high system operating flexibility while maximizing system performance and maintaining the gas turbine engine within an acceptable dynamics region. By effecting control of the gas turbine engine using recycled hot exhaust gas, the gas turbine engine can be more effectively modulated and maintained within desired operating conditions.

Referring now to the drawings, FIG. 1 illustrates a diagram of a system 10 in accordance with an embodiment. The system includes a gas turbine system 52 with a gas turbine engine 150 coupled to an exhaust gas recirculation (EGR) system 54. The illustrated gas turbine engine 150 includes a compressor section 152, a combustor section 154, and an expander section or turbine section 156. The compressor section 152 includes one or more exhaust gas compressors or compressor stages 158, such as 1 (one) to 20 (twenty) stages of rotary compressor blades disposed in a series arrangement. Likewise, the combustor section 154 includes one or more combustors 160, such as 1 (one) to 20 (twenty) combustors 160 distributed circumferentially about a rotational axis 162 of the gas turbine system 52. Furthermore, the combustor(s) 160 may include one or more fuel nozzles 164 configured to inject an oxidant 68 and/or a fuel 70 into the combustor(s) 160. For example, a head end portion 166 of each combustor 160 may house 1 (one), 2 (two), 3 (three), 4 (four), 5 (five), 6 (six), or more fuel nozzles 164, which may inject streams or mixtures of the oxidant 68, and/or the fuel 70 into a combustion portion 168 (e.g., a combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., an exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of NOX (e.g., NO and NO2). Regardless of the type of fuel nozzle 164, the gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as NOX emissions, the disclosed embodiments may use one or more diluents to help control the temperature and emissions while still avoiding any premixing of the fuel 70 and oxidant 68. For example, one or more diluents may be introduced separate from the fuel 70 and oxidant 68 (e.g., after the point of combustion and/or downstream from the diffusion flame), thereby helping to reduce the temperature and reduce the emissions (e.g., NOX emissions) produced by the diffusion flame.

In operation, as illustrated, the compressor section 152 receives and compresses a mixed stream of atmospheric air and the exhaust gas 66 from the EGR system 54, and outputs a compressed stream 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the gas turbine system 52, such as machinery 178 coupled to the turbine section 156 and/or machinery 180 coupled to the compressor section 152. In certain embodiments, the machinery 178, 180 may include one or more electrical generators, oxidant compressors for the oxidant 68, fuel pumps for the fuel 70, gear boxes, or additional drives (e.g. a steam turbine, electrical motor, etc.) coupled to the gas turbine system 52. As illustrated, the turbine section 156 outputs the exhaust gas 66 to recirculate along an exhaust recirculation path 110 from an exhaust outlet 182 of the turbine section 156 to an exhaust inlet 184 into the compressor section 152. Along the exhaust recirculation path 110, the exhaust gas 66 can pass through an exhaust gas (EG) processing system 54 (e.g., a heat recovery steam generator (HRSG) 56 and/or an exhaust gas recirculation (EGR) system 58 as described in greater detail below).

Again, each combustor 160 in the combustor section 154 receives, mixes, and stoichiometrically combusts the compressed stream 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 180. In other words, the compressor 188 may be directly or indirectly driven by mechanical power supplied by the shaft 176 of the gas turbine engine 150. In such an embodiment, the drive 190 may be excluded, because the compressor 188 relies on the power output from the turbine engine 150. However, in certain embodiments more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 180. In each of these embodiments, the compression system 186 compresses and supplies the oxidant 68 to the fuel nozzles 164 and the combustors 160. Accordingly, some or all of the machinery 178, 180 may be configured to increase the operational efficiency of the compression system 186 (e.g., the compressor 188 and/or additional compressors).

A variety of components of machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as exhaust gas booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176.

In an embodiment, the EGR system 54 may include a plurality of exhaust gas (EG) treatment components 192, such as indicated by element numbers 194, 196, and 198. These exhaust treatment components 192 (e.g., 194 through 198) may be disposed along the exhaust recirculation path 110 in one or more series arrangements, parallel arrangements, or any combination of series and parallel arrangements. For example, the exhaust treatment components 192 (e.g., 194 through 198) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), gas separation systems, gas purification systems, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements.

These exhaust gas treatment components 192 may enable feedback control of temperature, pressure, flow rate, and gas composition, while also removing moisture and particulates from the exhaust gas 66. Furthermore, the treated exhaust gas 66 may be extracted at one or more extraction points 76 and/or recirculated to the inlet 184 of the compressor section 152 as described in greater detail below. In an embodiment, the one or more extraction points 76 can be fluidly coupled with an exhaust gas supply system 78, e.g., having an exhaust gas extraction system and an exhaust gas treatment system, which receive exhaust gas 42 from the extraction points 76, treat the exhaust gas 42, and then supply or distribute the exhaust gas 42 to various target systems. The target systems may include an enhanced oil recovery system, a pipeline, a storage tank, or a carbon sequestration system.

As the treated, recirculated exhaust gas 66 passes through the compressor section 152, the gas turbine system 52 may bleed off a portion of the compressed stream along one or more lines 213 (e.g., bleed conduits or bypass conduits). Each line 213 may route the compressed stream into one or more heat exchangers 215 (e.g., cooling units), thereby cooling the compressed stream for recirculation back into the gas turbine system 52. For example, after passing through the heat exchanger 215, a portion of the cooled compressed stream may be routed to the turbine section 156 along line 213 for cooling and/or sealing of the turbine casing, turbine shrouds, bearings, and other components. In such an embodiment, the gas turbine system 52 does not route any oxidant 68 (or other potential contaminants) through the turbine section 156 for cooling and/or sealing purposes, and thus any leakage of the cooled compressed stream will not contaminate the hot products of combustion (e.g., working exhaust gas) flowing through and driving the turbine stages of the turbine section 156. By further example, after passing through the heat exchanger 215, a portion of the cooled compressed stream may be routed along line 217 (e.g., return conduit) to an upstream compressor stage of the compressor section 152, thereby improving the efficiency of compression by the compressor section 152. In such an embodiment, the heat exchanger 215 may be configured as an interstage cooling unit for the compressor section 152. In this manner, the cooled compressed stream helps to increase the operational efficiency of the gas turbine system 52, while simultaneously helping to maintain the purity of the exhaust gas (e.g., substantially free of oxidant and fuel).

Figure 2:
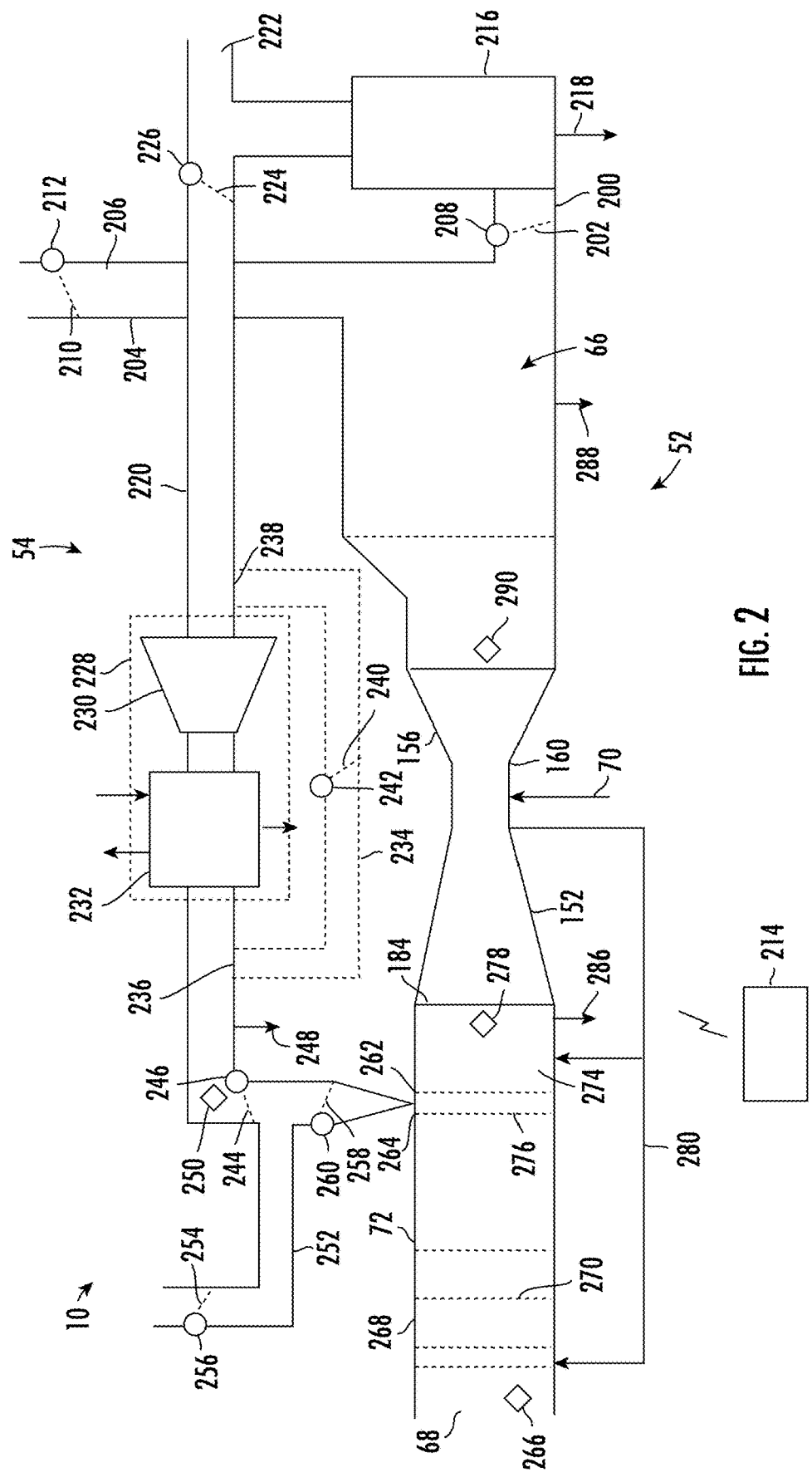
FIG. 2 is a schematic view of a system including a gas turbine system in accordance with embodiments of the present disclosure.

FIG. 2 illustrates a diagram of portions of the system 10 described with respect to FIG. 1. In particular, aspects of the EGR system 54 are depicted in FIG. 2 in simplified form to provide a clear understanding of an example airflow pathway through the system 10 that can be used to modulate airflow at the combustor 160, and more particularly, to modulate exhaust gas airflow injected into the inlet 184 of the compressor section 152 of the gas turbine system 52 from the EGR system 54. It should be understood that the architecture depicted in FIG. 2 is provided as an example and that other systems, components, features, and characteristics of the depicted system 10 can be otherwise included, modified, or adjusted to accommodate various system designs and requirements.

Figure 3:
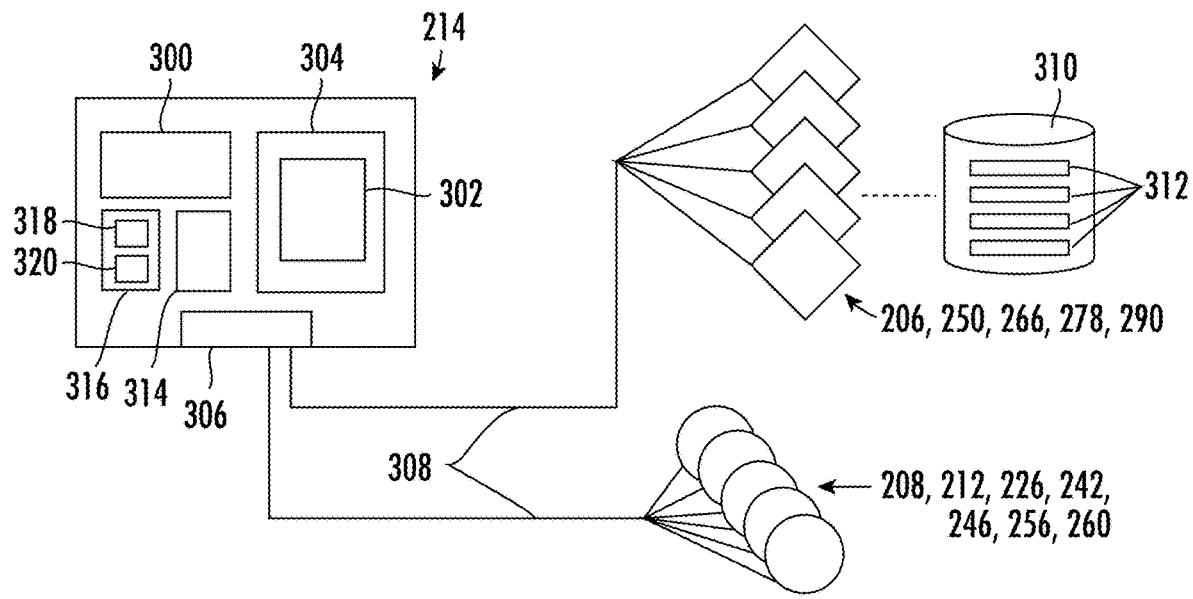
FIG. 3 is a schematic view of a portion of the system of FIG. 2 in accordance with embodiments of the present disclosure.

The gas turbine system 52 includes the combustor 160, compressor section 152, and the turbine section 156. Fuel 70 is injected into the combustor 160 by fuel nozzle(s) 164. The fuel 70 mixes with oxidant 68 and generates exhaust gas 66 which exits the combustor 160, and at least part of which is fed to the EGR system 54 through an inlet 200 of the EGR system 54. The inlet 200 of the EGR system 54 can be modulated to control an amount (e.g., a volumetric flow rate) of exhaust gas 66 entering the EGR system 54. For example, a damper 202 disposed in fluid communication with the inlet 200, such as within a conduit of the inlet 200, can be selectively actuated (moved) between an open position and a closed position by a motor 208, such as a servomotor. The motor 208 is in communication with a controller 214 (e.g., through wired or wireless communication) and receives signals from the controller 214 affecting a state of the damper 202 (modulating the damper) between the open and closed positions. The motor 208 can adjust the damper 202 towards the open position, towards the closed position, maintain a position of the damper 202, or otherwise modulate the position of the damper in response to instructions (signals) received from the controller 214. In the closed position, the damper 202 can prevent the flow of exhaust gas 66 into the EGR system 54. By modulating the damper 202, flow of exhaust gas 66 can be controlled to achieve a desired exhaust gas profile (e.g., a desired volumetric flowrate, a desired pressure, etc.) as controlled by the controller 214. In the fully open position, the damper 202 can provide maximum flow of exhaust gas 66 into the EGR system 54. In some instances, the maximum flow of exhaust gas 66 into the EGR system 54 may refer to all of the exhaust gas 66 generated by the combustor 160. That is, the damper 202 may allow all exhaust gas 66 discharged from the combustor 160 to enter the EGR system 54 when the damper 202 is in the open position. In other instances, the maximum flow of exhaust gas 66 may refer to less than the entire volume of exhaust gas 66 generated by the combustor 160. For instances, the EGR system 54 may be configured to receive only a portion of the exhaust gas 66 generated by the combustor 160 even when the damper 202 is in the fully open position, such as no greater than 90% of the exhaust gas 66, such as no greater than 75% of the exhaust gas 66, or even no greater than 50% of the exhaust gas. Remaining exhaust gas 66 can be routed away from the EGR system 54 by a conduit, often referred to as a flue 204. The flue 204 can vent to the ambient environment, another capture system or component, or the like. The flue 204 can include a sensor, such as a continuous emission monitoring system (CEMS) 206, that monitors one or more characteristics of exhaust gas 66 passing through the flue 204. As depicted in FIG. 3, the CEMS 206 can be in communication with the controller 214 to provide sensor data associated with the monitored condition(s) to the controller 214. The sensor data may be used by the controller 214 as described below. A flue damper 210 can be disposed in series with the flue 204 to control a flow of exhaust gas 66, and more particularly, to modulate exhaust gas 66 escaping to the ambient environment. The flue damper 210 can be disposed serially upstream of the CEMS 206, serially downstream of the CEMS 206 or in parallel therewith. The flue damper 210 can be actuated by a motor 212, such as a servomotor, in communication with the controller 214. The motor 212 is in communication with a controller 214 and receives signals from the controller 214 affecting a state of the flue damper 210 between the open and closed positions. The motor 212 can adjust the flue damper 210 towards the open position, towards the closed position, maintain a position of the flue damper 210, or otherwise modulate the position of the damper 210 in response to signals received from the controller 214. In the closed position, the flue damper 210 can prevent the exhaust gas 66 from exiting the flue 204. This can create backpressure within the system 10 and/or cause additional flow of exhaust gas into another portion of the system 10, such as a carbon capture and storage (CSS) system 216 described below. The flue damper 210 can be modulated between the closed position and the open position. Exhaust gas scrubbing can be performed by a filter or related scrubbing device at or near the flue 204 to further capture components of the exhaust gas 66 exiting the EGR system 54 through the flue 204. Yet other treatment and disposal processes are contemplated herein.

Exhaust gas 66 entering the inlet 200 of the EGR system 54 can pass through the carbon capture and storage (CCS) system 216 which can extract carbon from the exhaust gas 66 and sequester the extracted carbon. By way of example, the CCS system 216 can utilize wet chemistry whereby carbon dioxide ($CO_2$) is captured by adsorption to a chemical or physical solvent in an aqueous solution. In other embodiments, dry chemistry can be employed, such as a carbonate looping process. A direct contact cooler (DCC) can be employed by the CSS system 216 using chilled fluid, e.g., chilled water, to contact and cool the exhaust gas 66. The chilled water is fed through the DCC, which reduces the temperature of the exhaust gas 66, washes and scrubs the exhaust gas 66, captures residual contaminants in the exhaust gas 66, and lowers the moisture content of the exhaust gas 66. The CSS system 216 can generally utilize any carbon capture process that includes the steps of cooling a exhaust gas and using an ammoniated solution or slurry to remove $CO_2$ from the chilled gas. It is noted that the exhaust gas is cooled not only in the DCC, but also in absorber and water wash sections. Apart from cooling, a significant portion of the $CO_2$ absorption heat is also removed by using a mechanical refrigeration system depending on the ambient conditions and specific applications. Components of the exhaust gas 66 removed (scrubbed) can be removed in a blow down line 218.

Exhaust gas 66 enters an exhaust recirculation path 220 (which may be part of the exhaust recirculation path 110 described above with respect to FIG. 1). A flue gas outlet 222 in communication with the exhaust recirculation path 220 vents exhaust gas 66 from the exhaust recirculation path 20 to another location, such as an ambient environment, a storage system, or the like. A damper 224 may be disposed downstream to selectively restrict passage of exhaust gas 66 further along the exhaust recirculation path 220. The damper 224 can be actuatable by a motor 226, such as a servomotor, between an open position and a closed position. In certain instances, the damper 224 may be referred to as an EGR inlet damper. The damper 224 may be modulated between the open and closed positions to selectively route exhaust gas 66 through the exhaust recirculation path 220. The motor 226 can communicate with the controller 214 to affect a state of the damper 224 between the open, closed, and modulated positions. When the damper 224 is closed, the exhaust gas 66 is routed to the flue gas outlet 222. When the damper 224 is open or modulated between open and closed, the exhaust gas 66 (or a portion thereof) can pass through the exhaust recirculation path 220 towards further components which cause injection of the exhaust gas 66 as described below.

In an embodiment, the exhaust recirculation path 220 is in fluid communication with one or more conditioning components 228. The conditioning component(s) 228 can include, for example, one or more EGR blowers 230 (also referred to as a booster blower or a recycle blower) and one or more EGR coolers 232. The EGR blower(s) 230 can affect a flow rate of exhaust gas 66 within the exhaust recirculation path 220. The EGR cooler(s) 232 can reduce a temperature of the exhaust gas 66 before returning to the combustor 160. In order to reduce the thermal gradient across the one or more EGR coolers, the EGR may be "pre-cooled" via a first EGR cooler in order to lower the temperature of the EGR entering a second EGR cooler. The temperature of the cooling fluid used to pre-cool the EGR in the first EGR cooler may be higher than a temperature of the cooling fluid used to cool the EGR in the second EGR cooler. In this way, the overall temperature reduction of the EGR may be split across two EGR coolers, lowering the thermal gradient to which each cooler is exposed. The recycle blower 230 and EGR cooler 232 can be arranged in series or in parallel along the exhaust recirculation path 220 to affect a desirable characteristic (i.e., to condition) the exhaust gas 66 prior to injection into the combustor 160.

In an embodiment, the conditioning component(s) 228 may be arranged in parallel with an EGR recirculation loop 234. The EGR recirculation loop 234 can include an inlet 236 disposed upstream of the conditioning component(s) 228 and an outlet 238 disposed downstream of the conditioning component(s) 228. A damper 240 may be disposed along the EGR recirculation loop 234 between the inlet 236 and the outlet 238. The damper 240 can be controlled by a motor 242, such as a servomotor, to selectively modulate airflow of exhaust gas through the EGR recirculation loop 234. The motor 242 can be in communication with the controller 214 to open, close, and/or modulate a position of the damper 240 to adjust airflow through the EGR recirculation loop 234. For example, where the controller 214 determines a greater volume of recirculated exhaust gas 66 is desirable at the combustor 160, the controller 214 can send a signal to the motor 242 to open the damper 240 to permit greater volumetric flow through the exhaust recirculation path 220. Bypassing the conditioning component(s) 228 may allow for a more rapid adjustment of airflow through the exhaust recirculation path 220 than required where modulation happens in series with the conditioning component(s) 228. In other instances, the conditioning component(s) 228 can remain operating at a fixed (or range bound) state, with additional exhaust gas 66 passed to the combustor 160 through the EGR recirculation loop 234. In yet other instances, the EGR recirculation loop 234 may provide for reverse flow of exhaust gas 66 from a downstream location to an upstream location. For example, where airflow is throttled downstream of the conditioning component(s) 228, the EGR recirculation loop 234 may prevent buildup of backpressure downstream of the conditioning component(s) 228 by temporarily allowing exhaust gas to inject back into the exhaust recirculation path 220 upstream of the conditioning component(s) 228. Damper 224 may be modulated (i.e., moved towards the open or closed positions) to further control backpressure within the exhaust recirculation path 220 in response to exhaust gas 66 travelling through the EGR recirculation loop 234 towards an upstream location.

A damper 244 located downstream of the inlet 236 to the EGR recirculation loop 234 is controlled by a motor 246, such as a servomotor, to modulate flow of exhaust gas 66. The damper 244 can be selectively actuated (moved) between an open position and a closed position by the motor 246. The motor 246 is in communication with the controller 214 and receives signals from the controller 214 affecting a state of the damper 244 between the open and closed positions. The motor 246 can adjust the damper 244 towards the open position, towards the closed position, maintain a position of the damper 244, or otherwise modulate the position of the damper 244 in response to signals received from the controller 214. In the closed position, the damper 244 can prevent the flow of exhaust gas 66 to the combustor 160. The damper 244 can be modulated between the closed position and the open position to control exhaust flow. Excess exhaust gas can exit the exhaust recirculation path 220 through a drain 248 disposed upstream of the damper 244.

A sensor 250 disposed along the exhaust recirculation path 220 can measure one or more characteristics of the exhaust gas 66 at, or near, the damper 244. The one or more characteristics can include, for example, pressure, temperature, flowrate, humidity, or the like. The sensor 250 can additionally sample the exhaust gas 66 to detect another aspect thereof, such as particle count, presence of one or more combustion components, or the like. The sensor 250 can communicate the sensed one or more characteristics to the controller 214.

An EGR vent 252 is disposed downstream of the damper 244. The EGR vent 252 can vent to the ambient environment, another capture system or component, or the like. A damper 254 can be disposed at or in the EGR vent 252 to control flow of exhaust gas through the EGR vent 252. The damper 254 can be selectively actuated (moved) between an open position and a closed position by a motor 256, such as a servomotor. The motor 256 is in communication with the controller 214 and receives signals from the controller 214 affecting a state of the damper 254 between the open and closed positions. The motor 256 can adjust the damper 254 towards the open position, towards the closed position, maintain a position of the damper 254, or otherwise modulate the position of the damper 254 in response to signals received from the controller 214. In the closed position, the damper 254 can prevent the flow of exhaust gas 66 from the exhaust recirculation path 220. The damper 254 can be modulated between the closed position and the open position to control exhaust flow.

An EGR outlet damper 258 is disposed downstream of the EGR vent 252. The EGR outlet damper 258 can be selectively actuated (moved) between an open position and a closed position by a motor 260, such as a servomotor. The motor 260 is in communication with the controller 214 and receives signals from the controller 214 affecting a state of the EGR outlet damper 258 between the open and closed positions. The motor 260 can adjust the EGR outlet damper 258 towards the open position, towards the closed position, maintain a position of the EGR outlet damper 258, or otherwise modulate the position of the EGR outlet damper 258 in response to signals received from the controller 214. In the closed position, the EGR outlet damper 258 can prevent the flow of exhaust gas 66 from the exhaust recirculation path 220 to the combustor 160. The EGR outlet damper 258 can be modulated between the closed position and the open position to control exhaust flow. When open, the EGR outlet damper 258 can permit passage of exhaust 66 from the Exhaust recirculation path 220 to the inlet 184 of the combustor 160. In some instances, the EGR outlet damper 258 and the damper 244 can operate serially to form a dual outlet damper 258.

An outlet 262 of the exhaust recirculation path 220 can be in fluid communication with the inlet 184 of the combustor 160, such as at an inlet 264 located upstream of the inlet 184, such that exhaust gas 66 passing all the way through the EGR system 54 to back to the combustor 160 is injected into the upstream flow path with oxidant 68 for combustion. As depicted in FIG. 2, an upstream side of the combustor 160 can include various components configured to prepare airflow including oxidant 68 for combustion. These various components can include an oxidant sensor 266 configured to sense one or more characteristics of the airflow entering a pre-combustor section 268. The oxidant sensor 266 can be in communication with the controller 214 and send data regarding the one or more sensed characteristics of the oxidant in the pre-combustor section 268 to the controller 214. The pre-combustor section 268 can further include an inlet filter 270, one or more evaporative emission control systems (EVAPs) 272, and a drift eliminator 274. An EGR mixer 276 can be included, for example between the EVAPs 272 and drift eliminator 274, to mix exhaust gas 66 injected into the pre-combustor section 268 with oxidant 68.

A sensor 278 can be disposed upstream of the combustor 160 to detect one or more characteristics of the airflow, including, e.g., the injected exhaust gas 66 and the oxidant 68. The sensor 278 is in communication with the controller 214 and sends sensor data regarding the one or more sensed characteristics of the oxidant and exhaust gas 66 entering the combustor 160. As described below, the controller 214 can process and/or compare the data received from the sensors 266 and 278 to determine an effectiveness of the EGR system 54, and more particularly determine a status of the EGR system 54, which can be used for additional processing and closed loop control.

During some turbine operations, a turbine pressure ratio may reach an operating pressure ratio limit of the compressor. This may cause a compressor surge. The compressor pressure ratio may be larger than the turbine pressure ratio due to pressure losses across the combustor. Compressor pressure ratio protection typically involves bleeding and re-circulating discharge air to the compressor inlet. This operation, known as inlet bleed heat (IBH) control, also raises the temperature of the compressor inlet by mixing cooler ambient air with the bleed portion of the hot compressor discharge air. This is depicted in FIG. 2 by pathway 280. In an embodiment, the pathway 280 can be split into two segments, including a first segment 282 and a second segment 284. The first and second segments 282 and 284 can be coupled with the pre-combustor section 268 at staggered intervals along the airflow path to serially introduce the IBH into the pre-combustor section 268 thereby reducing introduction of sharp thermal gradients. Yet further, a drain 286 can be disposed in the pre-combustor section 268 to dissipate excess airflow and heat.

FIG. 3 illustrates a schematic view of various components of the system 10, such as sensors 206, 250, 266, and 278, motors 208, 212, 226, 246, 256, 260, and the controller 214 communicating with one another.

The controller 214 can generally include control circuitry having one or more processors 300 coupled to memory 302. The processor(s) 300 can include any suitable processing device (e.g., a control circuitry, a processor core, a microprocessor, an application specific integrated circuit, a field programmable gate array, a controller, a microcontroller, etc.) and can be one processor or a plurality of processors that are operatively connected. The memory 302 can include one or more non-transitory computer-readable storage media, such as RAM, ROM, EEPROM, EPROM, one or more memory devices, flash memory devices, etc., and combinations thereof. The memory 302 can store information that can be accessed by the processor(s) 300. For instance, the memory 302 (e.g., one or more non-transitory computer-readable storage mediums, memory devices) can include computer-readable instructions 304 that can be executed by the processor(s) 300. The instructions 304 can be software, firmware, or both written in any suitable programming language or can be implemented in firmware or hardware. Additionally, or alternatively, the instructions 304 can be executed in logically and/or virtually separate threads on processor(s) 300. For example, the memory 302 can store instructions 304 that when executed by the processor(s) 300 cause the processor(s) 300 to perform operations such as any of the operations and functions as described herein.

The controller 214 may communicate with the various components of the system 10 through a wired or wireless interface 306. In an embodiment, the sensors 206, 250, 266, and 278, and the motors 208, 212, 226, 246, 256, and 260 can be coupled to the controller 214 through one or more wired connections 308. The controller 214 receives data 310 from the sensors 206, 250, 266, and 278, the data 310 including information associated with one or more sensed characteristics 312 and controls (e.g., modulates) the motors 208, 212, 226, 246, 256, and 260 by sending signals through the wired connections 308. In another embodiment, the sensors 206, 250, 266, and 278, and the motors 208, 212, 226, 246, 256, and 260 can wirelessly communicate with the controller 214, e.g., through a wireless communication mode, such as an ultra-wideband communication network (UWB), a wireless universal serial bus (USB) communication network, a communication network that implements ZigBee® of ZigBee Alliance Corporation, a general packet radio service (GPRS) network, or the like.

The controller 214 generates command instructions that generally control operation of the EGR system 54 (FIG. 2) to inject exhaust gas 66 into the inlet 184 of the combustor 160 to increase performance and efficiency of the system 10. In addition to relying on data 310, the controller 214 can generate the command instructions based, in part, on algorithms stored in memory, such as memory 302. These algorithms, for example, may enable the controller 214 to maintain NOx and $CO_2$ emissions in the exhaust to within certain predefined emission limits, or, in another instance, maintain the combustor firing temperature to within predefined limits. It will be appreciated that algorithms may include inputs for parameter variables such as compressor pressure ratio, ambient humidity, inlet pressure loss, turbine exhaust backpressure, as well as any other suitable parameters. The schedules and algorithms executed by the controller 214 accommodate variations in ambient conditions that affect emissions, combustor dynamics, firing temperature limits at full and part-load operating conditions, maintaining a part-load efficiency within a part load operating threshold, maintaining base load operation threshold requirements, etc. The controller 214 may apply algorithms for scheduling the gas turbine, such as those setting desired turbine exhaust temperatures and combustor fuel splits, with the objective of satisfying performance objectives while complying with operability boundaries of the gas turbine system. For example, the controller 214 may determine combustor temperature rise and NOx during part-load operation in order to increase the operating margin to the combustion dynamics boundary and thereby improve operability, reliability, and availability of the generating unit.

Figure 4:
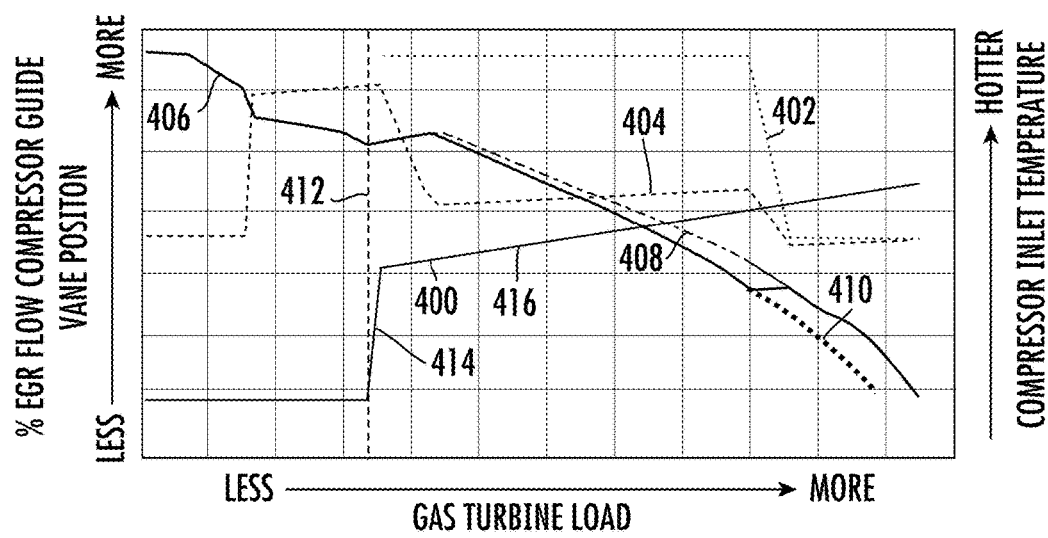
FIG. 4 is a graph depicting aspects of an exhaust gas recirculation (EGR) system as a result of net GT load in accordance with embodiments of the present disclosure.

FIG. 4 illustrates a graphical representation of EGR control parameters of an example system with the X-axis representing loading in megawatts (mw) and the Y-axis representing EGR percentage, compressor inlet temperature (CTIM) in degrees Fahrenheit. Line 400 depicts percentage of maximum EGR (% EGR). Line 402 depicts EGR $T_{DEMAND}$. Line 404 depicts CTIM with the EGR. Line 406 depicts inlet guide vane (IGV) temperature. Line 408 depicts IGV temperature—cold, and line 410 depicts IGV temperature—hot.

Figure 5:
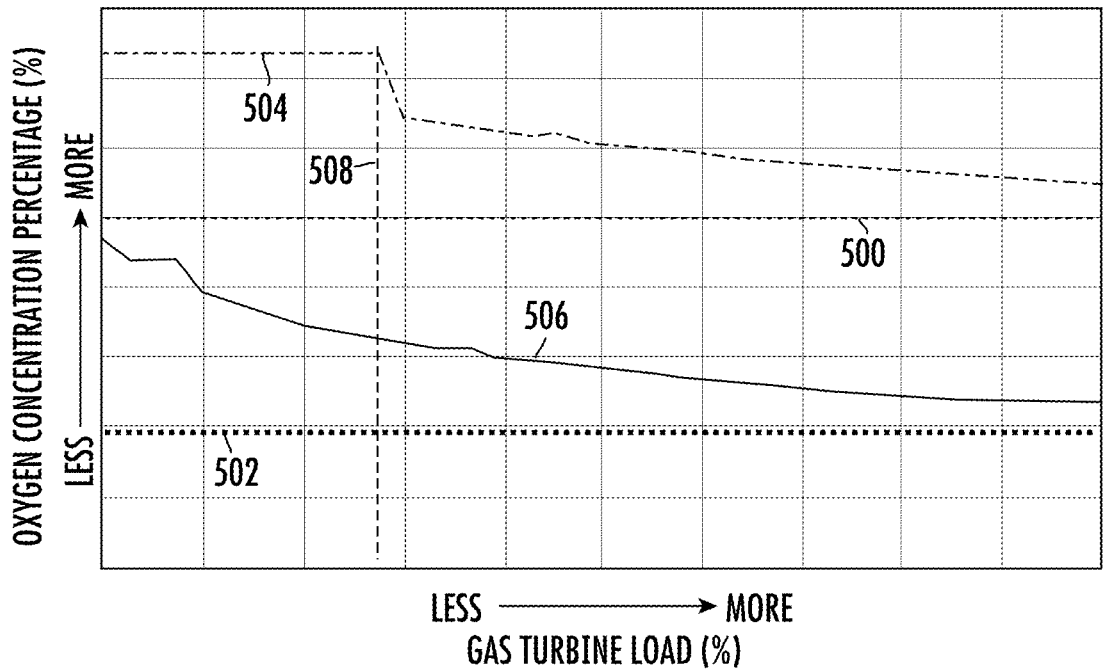
FIG. 5 is a graph depicting oxygen ($O_2$) concentration percentage as a result of load percentage in accordance with embodiments of the present disclosure.

FIG. 5 illustrates a graphical representation of Oxygen ($O_2$) concentration as detected in the system 10 as a result of loading the system. The X-axis represents percentage of maximum load (% Load) and the Y-axis represents a relative amount of $O_2$. Line 500 depicts a minimum $O_2$ concentration necessary to maintain a flame at the combustor 160 (FIG. 2). Line 500 is generally set at 15-17% $O_2$ concentration, below which point the flame becomes difficult to maintain and performance rapidly deteriorates. Line 502 depicts a minimum $O_2$ concentration necessary to effectively operate (run) a duct burner 288 (FIG. 2) downstream of the combustor 160. Line 502 is generally set at 10-12% $O_2$ concentration, below which point the flame of the duct burner 288 (FIG. 2) becomes difficult to maintain. Line 504 depicts $O_2$ concentration at the inlet 184 of the combustor 160 as a result of load percentage. Line 506 depicts $O_2$ concentration at an outlet of the combustor 160 as a result of load percentage. In an embodiment, $O_2$ concentration measured at the inlet 184 of the combustor 160 is measured by the sensor 278 and $O_2$ concentration measured at the outlet of the combustor 160 may be measured by the sensor 290.

Referring again to FIG. 4, a vertical line 412 is depicted at the minimum emissions-compliant load (MECL), here, approximately 165 megawatts. Prior to achieving MECL, the EGR system 54 (FIG. 2) may be in an off state as shown by line 400. That is, exhaust gas 66 is not actively injected into the inlet 184 of the combustor 160 prior to achieving MECL. To affect the EGR system 54 to the off state, the controller 214 can cause one or more of the motors 208, 212, 226, 242, 246, 256, and/or 260 to close an associated damper 202, 210, 224, 240, 244, 256, and/or 258, thereby preventing the flow of exhaust gas from reaching the outlet 262 and entering the oxidant 68 flow path. Often, the damper(s) 202, 210, 224, 240, 244, 256, and/or 258 start in a closed state prior to operation of the system 10. Beginning at line 412 (upon achieving MECL), the EGR system 54 is permitted by the controller 214 to inject exhaust gas 66 into the oxidant 68 flow path. Initially, the EGR system 54 may ramp up (increase) the rate of injection at a first rate, as indicated at section 414 of the line 400. To affect the ramp up indicated at section 414 of the line 400, the controller 214 can cause one or more of the motors 208, 212, 226, 242, 246, 256, and/or 260 (such as all of the motors) to move an associated damper 202, 210, 224, 240, 244, 256, and/or 258, towards the open position thereby allowing a flow of exhaust gas to reach the outlet 262 and mix with the oxidant 68 at an increasing rate. After some period of time, the EGR system 54 may continue ramping up at a second rate, as indicated at section 416 of the line 400, that is less than the first rate. The EGR system 54 continues to ramp up injection of exhaust gas 66 to the inlet 184 of the combustor 160, e.g., at the second rate.

As depicted in FIG. 5, $O_2$ concentration at the inlet 184, i.e., as measured by the sensor 278 and represented by line 504, remains at ambient conditions (approximately 21%) until the system 10 reaches a load percentage of approximately 20-40% load, represented by line 508, at which time the system 10 is above MECL. After reaching MECL, the $O_2$ concentration at the inlet 184 drops as a result of introduced exhaust gas 66. The $O_2$ concentration continues to drop as the EGR system 54 increases the volume of exhaust gas injected to the inlet 184 of the combustor 160. However, the $O_2$ concentration remains above the minimum $O_2$ concentration necessary to maintain the flame at the combustor 160, represented by line 500, until achieving 100% (maximum) load. As depicted by line 506, the $O_2$ concentration at the outlet of the combustor 160 remains above the $O_2$ concentration necessary to effectively operate (run) the duct burner 288, represented by line 502, until achieving 100% (maximum) load. Thus, the EGR system 54 does not negatively affect combustion by causing flame issues at the combustor or duct burner.

Figure 6:
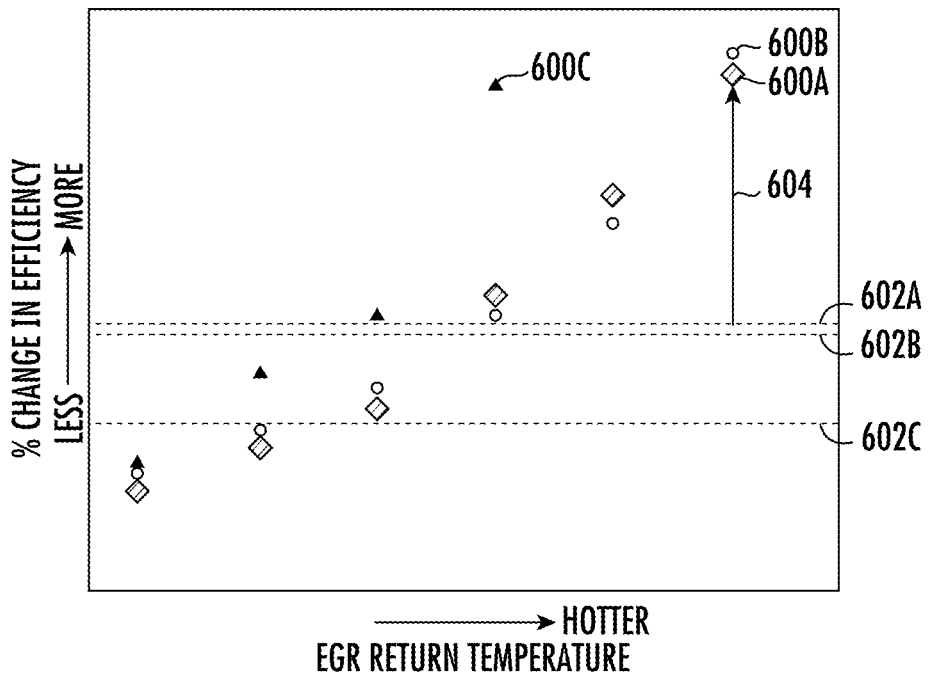
FIG. 6 is a graph of system efficiency as measured at various loads in accordance with embodiments of the present disclosure.
Figure 7:
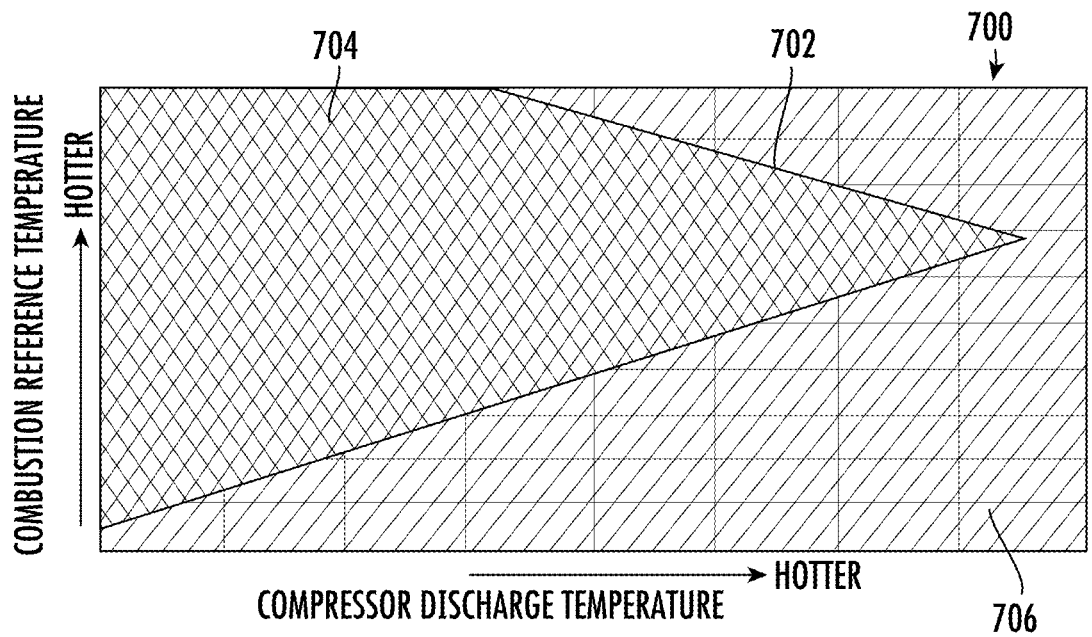
FIG. 7 is a graph of combustor engine tone dynamics in accordance with embodiments of the present disclosure.
Figure 8:
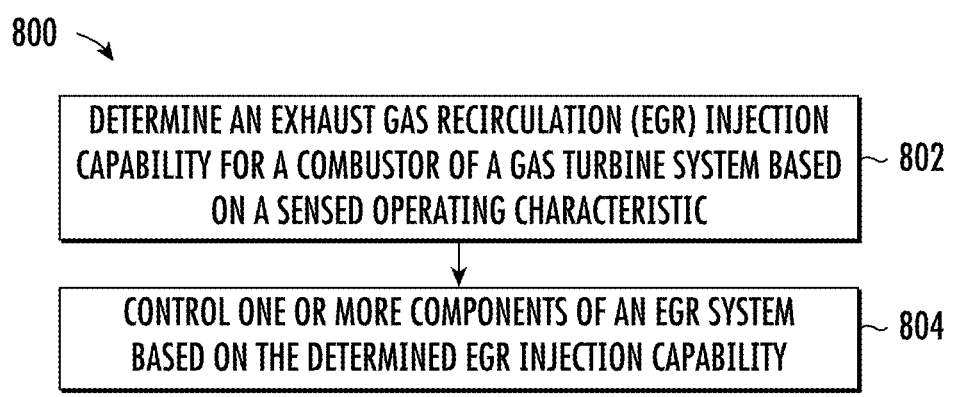
FIG. 8 is a flow chart of a method of modulating exhaust gas from an exhaust gas recirculation (EGR) system to heat airflow at an inlet of a compressor to meet combustor operability requirements of a gas turbine system.

FIGS. 6 to 8 illustrate graphical depictions of system efficiency at various relative loads exerted on an example gas turbine system 52. In particular, FIG. 6 depicts system efficiency as measured at 40% relative load over a range of EGR return temperatures, FIG. 7 depicts system efficiency at 60% relative load over a range of EGR return temperatures, and FIG. 8 depicts system efficiency at 80% relative load over a range of EGR return temperatures. In all of FIGS. 6 to 8, the X-axis represents EGR return temperature, i.e., the temperature of the exhaust gas 66 injected at the inlet 184 of the combustor 160 as measured in degrees Celsius, and the Y-axis represents net system efficiency as a result of the EGR return temperature.

Referring to FIG. 6, a graph of net efficiency is depicted at 40% relative load 600A, at 60% relative load 600B and at 80% relative load 600C. The relative loads 600A, 600B, and 600C are depicted in a manner for easier understanding. In practice, the relative loads 600A, 600B, and 600C do not overlap on the Y-axis. Instead, the relative loads 600A, 600B, and 600C would be displaced from one another in a direction of the Y-axis. For simple illustration, the leftmost points of relative loads 600A, 600B, and 600C are positioned at a relatively common starting point. In practice, the leftmost points of relative loads 600A, 600B, and 600C vary. For example, the leftmost point of relative load 600A may be at approximately 42.5% while the leftmost point of relative load 600B may be at approximately 48.5%, while the leftmost point of relative load 600C may be at approximately 52.2%. Each of the relative loads 600A, 600B, and 600C includes a line 602A, 602B, and 602C, respectively, at system efficiency as measured without EGR. That is, lines 602A, 602B, and 602C represent system efficiency when no EGR exhaust gas is injected at the inlet 184 of the combustor 160 and system efficiency is estimated. Testing data was collected for EGR exhaust gas injected at the inlet 184 at 6 (six) different temperatures, including at approximately 17° C. (leftmost point), at approximately 23° C., at approximately 28° C., at approximately 34° C., at approximately 39° C., and at approximately 45° C. (rightmost point). Testing at 17° C., 23° C., and 28° C. was performed by cooling the EGR exhaust gas beyond ambient conditions where lines 602A, 602B, and 602C were measured. Testing at 34° C., 39° C., and 45° C. was performed above ambient EGR temperatures where line 602 was measured. As depicted, increased EGR stream temperature facilitates in increasing the inlet stream temperature to the compressor section and optimizing/minimizing of the compressor discharge air extraction through inlet bleed heating system thereby improving the part load system efficiency.

As graphically depicted in FIG. 6, increasing EGR injection to the combustor 160 increases system efficiency, allowing the gas turbine system 52 to operate with greater effectiveness while reducing fuel consumption. In addition to improving system efficiency, the EGR system 54 can assist in modulating control of tone dynamics. While higher combustion gas temperatures (such as those introduced by employing large amounts of EGR injection generally improve the thermodynamic efficiency of the combustor, higher combustion gas temperatures also promotes flame holding conditions in which the combustion flame migrates toward the fuel being supplied by the fuel nozzles, possibly causing accelerated wear to the fuel nozzles in a relatively short amount of time. In addition, higher combustion gas temperatures generally increase the disassociation rate of diatomic nitrogen, increasing the production of nitrogen oxides (NOX). Conversely, a lower combustion gas temperature associated with reduced fuel flow and/or part load operation (turndown) generally reduces the chemical reaction rates of the combustion gases, increasing the production of carbon monoxide and unburned hydrocarbons.

Although effective at enabling higher operating temperatures while protecting against flame holding and controlling undesirable emissions, at particular operating conditions, some combustors may produce combustion instabilities that result from an interaction or coupling of the combustion process or flame dynamics with one or more acoustic resonant frequencies of the combustor. For example, one mechanism of combustion instabilities may occur when the acoustic pressure pulsations cause a mass flow fluctuation at a fuel port which then results in a fuel-air ratio fluctuation in the flame zone. When the resulting fuel/air ratio fluctuation and the acoustic pressure pulsations have a certain phase behavior (e.g., approximately in-phase), a self-excited feedback loop results. This mechanism, and the resulting magnitude of the combustion dynamics, depends on the delay time between the injection of the fuel and the time when it reaches the flame zone, known in the art as convective time (Tau). As the convective time increases, the frequency of the combustion instabilities decreases, and when the convective time decreases, the frequency of the combustion instabilities increases. The result is combustion dynamics that may reduce the useful life of one or more combustor and/or downstream components. For example, the combustion dynamics may produce pressure pulses inside the fuel nozzles and/or combustion chambers that may adversely affect the high cycle fatigue life of these components, the stability of the combustion flame, the design margins for flame holding, and/or undesirable emissions. Alternately, or in addition, combustion dynamics at specific frequencies and with sufficient amplitudes, that are in-phase and coherent, may produce undesirable sympathetic vibrations in the turbine and/or other downstream components. By shifting the frequency of the combustion instability in one or more combustors away from the others, the coherence of the combustion system as a whole will be reduced, and the combustor-to-combustor coupling will be diminished. This reduces the ability of the combustor tone to cause a vibratory response in downstream components and also encourages destructive interference from combustor-to-combustor, reducing combustion dynamics amplitudes.

Referring to FIG. 7, a graphical depiction 700 of combustor operability is depicted. In particular, FIG. 7 illustrates a combustor engine tone dynamic boundary 702 as measured in view of compressor discharge temperature. The X axis depicts compressor discharge temperature and the Y axis represents operating temperature of the combustor. An avoidance region 704 is shown to the left of the combustor engine tone dynamic boundary 702. In the avoidance region 704, the dynamics of the combustion system are high which can lead to damage to the hardware and downstream systems of the gas turbine system. To the right of the combustor engine tone dynamic boundary 702 is an acceptable dynamics region 706. Tone dynamics in the acceptable dynamics region 706 are ideal for dry load operation of the gas turbine system.

As EGR exhaust gas is injected into the combustor at higher temperatures and/or higher flow rates, the compressor discharge temperature increases, i.e., moves towards the right. As a result, tone dynamics of the gas turbine system improves from the avoidance region 704 to the acceptable dynamics region 706. This allows the gas turbine system to exhibit increased cold turndown capability while remaining MECL compliant. While inlet bleed heat (IBH) can be used to control tone dynamics, the volumetric flow rate capability of IBH is limited in view of combustor operability. Injecting increased EGR exhaust gas reduces inlet bleed heat (IBH) requirements and results in a more open inlet guide vane (IGV) angle, which further improves part load efficiency and increases life cycle. EGR injection rates and temperatures can be monitored and adjusted to operate as a control effector to manage combustor operability and maintain operation of the gas turbine system within the acceptable dynamics region 906. EGR can thus provide additional authority and capacity to maintain hotter running temperatures at the combustor more efficiently than IBH. The controller 214 can utilize information relating to IBH control or the like to further modify control of the EGR system 54.

The injection of EGR into the compressor is not without limits. As EGR injection flow rate increases, $O_2$ concentration decreases. Beyond a critical threshold (depicted in FIG. 5 by line 500), $O_2$ concentration is too low to maintain a flame, resulting in blow out. As a result, EGR injection is limited by oxygen requirements to maintain combustibility. The controller 214 (FIG. 2) is thus required to monitor combustibility and inject a threshold limit flow frate into the combustor 160 to maintain flame and improve system efficiency (FIG. 6) while also keeping the tone dynamic within the acceptable dynamics region 706 (FIG. 7).

Referring again to FIG. 3, the controller 214 (and more particularly the processor 300 operating with memory 302 and/or external/other memory) can perform control processing using data received, e.g., from any one or more of the sensors 206, 250, 266, 278, and 290, to affect control of the EGR system 54. The controller 214 can rely at least partially on a model-based control strategy. In an embodiment, sensor data from one or more of the sensors 206, 250, 266, 278, and 290 are transmitted to the controller 214 to be used to initialize control of the EGR system 54. The controller 214 can rely on a model 314 of the plant or engine to analyze the transmitted data. The model 314 can be used by the controller 214 to generate one or more state parameters which can include estimates of performance parameters. In a particular embodiment, the model 314 can be an adaptive real-time engine simulation (ARES) implemented with a Kalman filter. The ARES can be a model adapted for use with a model-based controller for relatively large-scale industrial gas turbines. In other embodiments, the model 314 can include a recursive-type filter, a recursive estimator, an adaptive digital-type filter, an extended Kalman filter, or any other filter, algorithm, device or method similar to those described herein.

The state parameters from the model 314 can be transmitted to a model-based predictive control module or control module 316. The control module 316 can use the state parameters to perform an optimization to determine commands for one or more actuators of the plant or engine. For example, the control module 316 can perform an optimization to determine an operating condition of the combustor 160 (FIG. 2) and an amount of EGR capacity at the combustor 160 based on the determined operating condition, and optionally further in view of a measured EGR characteristic. In this regard, the control module 316 can include an optimizer 318 and a model 320. The model 320 associated with the control module 316 may be identical to the model 314. In a particular embodiment, either or both models 314 or 320 can be an adaptive real-time engine simulation (ARES) implemented with a Kalman filter. Using either or both of the models 314 or 320 allows optimization of EGR exhaust gas injection.

In use, embodiments of the invention can be utilized to initialize the models 314 or 320 on startup. Furthermore, embodiments of the invention can be utilized to re-initialize the dynamic states of the models 314 or 320 after any time of event, such as load rejection or a sensor failure. Other embodiments of the invention can be used to initialize dynamic states of other types of machines or devices in other circumstances.

FIG. 8 depicts a flow chart of a method 800 of modulating exhaust gas from an exhaust gas recirculation (EGR) system to heat airflow at an inlet of a combustor of a gas turbine system in accordance with an embodiment. The method 800 includes determining 802 an EGR injection capability for a combustor of a gas turbine system based on a sensed operating characteristic. The sensed operating characteristic can include one or more characteristics as measured by a sensor. For example, as depicted in FIG. 3, one or more characteristics 312 are measured by the sensors 206, 250, 266, 278, and 290. One or more data transmission streams including the data 310 are sent to the wired or wireless interface 306 of the controller 214. The controller 214 processes the received data 310, e.g., using models 314 or 320, and generates/determines control instructions for affecting operation of the EGR system. The method 800 further includes modulating 804 one or more components, such as one or more dampers of the EGR system, based on the determined EGR injection capacity to maximize a temperature at the inlet of the combustor while maintaining a part load efficiency within a part load operating threshold and maintaining a base load efficiency within a base load operating threshold. Modulation 804 can occur by transmitting the determined control instructions to various components within the system, such as one or more of the motors 208, 212, 226, 246, 256, and/or 260 to adjust the associated dampers 202, 210, 224, 240, 244, 256, and/or 258. The resulting adjustment causes the EGR system to inject EGR gas at a desired flow rate to the inlet of the combustor. The controller 214 continues to monitor the one or more characteristics 312 and further continues to generate control instructions for further affecting operation of the EGR system to maximize system performance and system efficiency while maintaining the gas turbine engine within the acceptable dynamics region.

Further aspects of the invention are provided by one or more of the following embodiments:

Embodiment 1. A system comprising: a gas turbine system comprising: a combustor configured to receive and combust a fuel with an oxidant; a turbine driven by combustion products from the combustor; a compressor configured to compress and supply the oxidant to the combustor; an exhaust gas recirculation (EGR) system configured to recirculate the exhaust gas along an exhaust recirculation path from the turbine to an inlet of the compressor; and an inlet sensor disposed adjacent to the inlet of the compressor, the inlet sensor configured to detect one or more characteristics at the inlet; a generator driven by the turbine, wherein the generator is configured to generate electrical power and export a portion of the electrical power to an electrical grid; and a control system comprising: one or more dampers disposed along the exhaust recirculation path and actuatable between open and closed positions; and a controller in communication with the inlet sensor and configured to: receive sensor data associated with a sensed one or more characteristics detected at the inlet; and cause actuation of at least one of the one or more dampers based on the received sensor data to control a temperature at the inlet of the compressor.

Embodiment 2. The system of embodiment 1, wherein the exhaust recirculation path comprises an outlet in fluid communication with the inlet of the compressor, and wherein the one or more dampers comprises an EGR outlet damper disposed between the outlet of the exhaust recirculation path and the inlet of the compressor.

Embodiment 3. The system of embodiment 2, wherein the EGR system comprises an EGR sensor disposed along the exhaust recirculation path, wherein the EGR sensor is configured to detect a characteristic of the exhaust gas, wherein the EGR sensor is disposed between an exhaust gas compressor and the outlet damper, and wherein the EGR sensor is configured to transmit sensor data to the controller.

Embodiment 4. The system of embodiment 3, wherein the system further comprises: an EGR vent disposed between the EGR sensor and the EGR outlet damper; and a vent damper in fluid communication with the EGR vent to selectively vent exhaust gas from the exhaust recirculation path.

Embodiment 5. The system of any one or more of embodiments 1 to 4, wherein the sensed one or more characteristics at the inlet includes one or more of: a temperature, a moisture content, a flow rate, or a pressure of airflow at the inlet, and wherein the controller is configured to modulate at least one of the one or more dampers in response to the sensed one or more characteristics.

Embodiment 6. The system of any one or more of embodiments 1 to 5, wherein the controller comprises a processor in electric communication with a memory storing instructions, the instructions executable by the processor to actuate the one or more dampers to maximize a temperature at the inlet of the compressor while maintaining a part load efficiency within a part load operating threshold and maintaining a base load efficiency above a minimum emissions-compliant load (MECL).

Embodiment 7. The system of any one or more of embodiments 1 to 6, wherein the controller is further configured to maintain at least a threshold oxidant level at the inlet of the compressor in view of exhaust gas introduced to the inlet by the EGR system, wherein the threshold oxidant level is based on a combustor specification requirement.

Embodiment 8. The system of any one or more of embodiments 1 to 7, wherein the controller is further configured to determine a maximum injectable amount of the exhaust gas from the EGR system into the inlet while maintaining at least a threshold oxidant level at the inlet, and wherein causing actuation of the at least one of the one or more dampers is performed in view of the determined maximum injectable amount of the exhaust gas.

Embodiment 9. The system of any one or more of embodiments 1 to 8, wherein the controller is configured to process the received sensor data and generate control instructions in view of the processed sensor data, and wherein the controller is configured to process the received sensor data using an adaptive real-time engine simulation (ARES).

Embodiment 10. A non-transitory computer-readable medium storing instructions which, when executed, causes performance of a method of modulating an exhaust gas recirculation (EGR) system to inject exhaust gas into an inlet of a compressor of a gas turbine system, the method comprising: receiving, at a controller of the gas turbine system, sensor data from an inlet sensor, the sensor data including one or more of: a temperature, a humidity, a flow rate, or a pressure of fluid at the inlet; processing, by a processor of the controller, the sensor data received from the inlet sensor to determine a current operating characteristic at the inlet; determining, by the processor, an EGR injection capacity based on the current operating characteristic at the inlet, the EGR injection capacity defining a maximum injectable amount of the exhaust gas from the EGR system into the inlet of the compressor; and controlling, by the processor, one or more dampers associated with the EGR system to modulate an amount of the exhaust gas injected into the inlet based on the determined EGR injection capacity.

Embodiment 11. The non-transitory computer-readable medium of embodiment 10, wherein processing the sensor data comprises using an adaptive real-time engine simulation (ARES).

Embodiment 12. The non-transitory computer-readable medium of any one or more of embodiments 10 or 11, wherein the method further comprises: receiving, at the controller, sensor data from an EGR sensor disposed along an exhaust recirculation path of the EGR system, wherein the EGR sensor is configured to detect a characteristic of the exhaust gas within the exhaust recirculation path; processing, by the processor, the sensor data received from the EGR sensor to determine a current characteristic at the exhaust gas; and further determining, by the processor, the EGR injection capacity based on the current characteristic of the exhaust gas.

Embodiment 13. The non-transitory computer-readable medium of embodiment 12, wherein the sensor data received at the controller from the EGR sensor includes one or more of: a temperature, a humidity, a pressure, or a flow rate.

Embodiment 14. The non-transitory computer-readable medium of any one or more of embodiments 12 or 13, wherein the exhaust recirculation path comprises an outlet in fluid communication with the inlet of the compressor, wherein the one or more dampers comprises an outlet damper disposed between the outlet of the exhaust recirculation path and the inlet of the compressor, and wherein controlling the one or more dampers comprises modulating the outlet damper to control a volume of exhaust gas injected to the inlet to achieve the EGR injection capacity determined by the processor.

Embodiment 15. The non-transitory computer-readable medium of embodiment 14, wherein the exhaust recirculation path further comprises an EGR vent disposed between the EGR sensor and the outlet damper, wherein controlling the one or more dampers comprises controlling a vent damper to modulate exhaust gas escape from the EGR system through the EGR vent, and wherein modulating exhaust gas escape is performed based on the volume of exhaust gas injected to the inlet.

Embodiment 16. The non-transitory computer-readable medium of any one or more of embodiments 12 to 15, wherein controlling the one or more dampers comprises actuating a motor coupled to the one or more dampers to reposition an orientation of the one or more dampers to adjust a flow rate of exhaust gas to the inlet.

Embodiment 17. The non-transitory computer-readable medium of any one or more of embodiments 12 to 16, wherein determining the EGR injection capacity is performed in further view of maximizing temperature at the inlet while maintaining a part load efficiency within a part load operating threshold and maintaining MECL.

Embodiment 18. A method of modulating exhaust gas from an exhaust gas recirculation (EGR) system to heat airflow at an inlet of a compressor of a gas turbine system, the method comprising: determining an EGR injection capacity for an inlet of a compressor of a gas turbine system based on a sensed operating characteristic of airflow at the inlet, the EGR injection capacity defining a maximum injectable amount of an exhaust gas from an EGR system of the gas turbine system into the inlet of the compressor while maintaining at least a threshold oxidant level at the inlet; and modulating one or more dampers of the EGR system based on the determined EGR injection capacity to maximize a temperature at the inlet of the compressor while maintaining a part load efficiency within a part load operating threshold and maintaining a base load efficiency within a base load operating threshold.

Embodiment 19. The method of embodiment 18, wherein the sensed operating characteristic includes one or more of: a temperature, a humidity, a flow rate, or a pressure, and wherein modulating the one or more dampers is further based on sensor data from an EGR sensor disposed along an exhaust recirculation path of the EGR system, wherein the EGR sensor is configured to detect a characteristic of the exhaust gas within the exhaust recirculation path.

Embodiment 20. The method of any one or more of embodiments 18 or 19, wherein determining the EGR injection capacity comprises inputting the sensed operating characteristics into an adaptive real-time engine simulation.

Embodiment 21. The method of any one or more of embodiments 18 to 20, wherein determining the EGR injection capacity is performed in further view of maximizing temperature at the inlet while maintaining a part load efficiency within a part load operating threshold and maintaining MECL.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system comprising:
    a gas turbine system comprising:
        a compressor;
        a combustor;
        a turbine;
        an exhaust gas recirculation (EGR) system configured to recirculate at least a portion of exhaust gas along an exhaust recirculation path from the turbine to an inlet of the compressor, wherein the exhaust recirculation path comprises an outlet in fluid communication with the inlet of the compressor; and
        an inlet sensor configured to detect one or more characteristics at the inlet;
    a control system comprising:
        one or more dampers disposed along the exhaust recirculation path and actuatable between open and closed positions, wherein the one or more dampers comprises an EGR outlet damper disposed at the outlet of the exhaust recirculation path to control injection of exhaust gas to the inlet of the compressor;
        an EGR sensor disposed along the exhaust recirculation path, wherein the EGR sensor is configured to detect a characteristic of the exhaust gas, wherein the EGR sensor is disposed between an exhaust gas compressor and the outlet damper; and
        a controller in communication with the inlet sensor, wherein the EGR sensor is configured to transmit sensor data to the controller, and wherein the controller is configured to:
            receive sensor data from the inlet sensor, the sensor data associated with a characteristic detected at the inlet;
            determine an EGR injection capacity based at least in part on the sensor data; and
            modulate a position of at least one of the one or more dampers based on the received sensor data in view of the determined EGR injection capacity to control an amount of exhaust gas injected into the compressor.

2. The system of claim 1, wherein the system further comprises:
    an EGR vent disposed upstream of the EGR outlet damper; and
    a vent damper in fluid communication with the EGR vent to selectively vent exhaust gas from the exhaust recirculation path in view of instructions received from the controller.

3. The system of claim 1, wherein the sensed characteristic at the inlet includes one or more of: a temperature, a moisture content, a flow rate, or a pressure of airflow at the inlet, and wherein the controller is configured to modulate at least one of the one or more dampers in response to the sensed one or more characteristics.

4. The system of claim 1, wherein the controller comprises a processor in electric communication with a memory storing instructions, the instructions executable by the processor to modulate a position of the one or more dampers to maximize a temperature at the inlet of the compressor while maintaining a part load efficiency within a part load operating threshold and maintaining a base load efficiency above a minimum emissions-compliant load (MECL).

5. The system of claim 1, wherein the EGR injection capacity defines a maximum injectable amount of the exhaust gas from the EGR system into the inlet of the compressor while maintaining at least a threshold oxidant level at the inlet.

6. The system of claim 5, wherein the EGR injection capacity is determined in view of inlet bleed heat (IBH) control.

7. A non-transitory computer-readable medium storing instructions which, when executed, causes performance of a method of modulating an exhaust gas recirculation (EGR) system to inject exhaust gas into an inlet of a compressor of a gas turbine system, the method comprising:
receiving, at a controller of the gas turbine system, sensor data from an inlet sensor, the sensor data including one or more of: a temperature, a humidity, a flow rate, or a pressure of fluid at the inlet;
processing, by a processor of the controller, the sensor data received from the inlet sensor to determine a current operating characteristic at the inlet;
determining, by the processor, an EGR injection capacity based on the current operating characteristic at the inlet and inlet bleed heat (IBH) control, the EGR injection capacity defining a maximum injectable amount of the exhaust gas from the EGR system into the inlet of the compressor; and
controlling, by the processor, one or more dampers associated with the EGR system to modulate an amount of the exhaust gas injected into the inlet based on the determined EGR injection capacity.

8. The non-transitory computer-readable medium of claim 7, wherein processing the sensor data comprises using an adaptive real-time engine simulation (ARES).

9. The non-transitory computer-readable medium of claim 7, wherein controlling the one or more dampers comprises actuating a corresponding motor coupled to each of the one or more dampers to reposition an orientation of the one or more dampers to adjust a flow rate of exhaust gas to the inlet.

10. The non-transitory computer-readable medium of claim 7, wherein determining the EGR injection capacity is performed in further view of maximizing temperature at the inlet while maintaining a part load efficiency within a part load operating threshold and maintaining MECL.

11. The non-transitory computer-readable medium of claim 7, wherein the method further comprises:
receiving, at the controller, sensor data from an EGR sensor disposed along an exhaust recirculation path of the EGR system, wherein the EGR sensor is configured to detect a characteristic of the exhaust gas within the exhaust recirculation path;
processing, by the processor, the sensor data received from the EGR sensor to determine a current characteristic at the exhaust gas; and
further determining, by the processor, the EGR injection capacity based on the current characteristic of the exhaust gas.

12. The non-transitory computer-readable medium of claim 11, wherein the sensor data received at the controller from the EGR sensor includes one or more of: a temperature, a humidity, a pressure, or a flow rate.

13. The non-transitory computer-readable medium of claim 11, wherein the exhaust recirculation path comprises an outlet in fluid communication with the inlet of the compressor, wherein the one or more dampers comprises an outlet damper disposed between the outlet of the exhaust recirculation path and the inlet of the compressor, and wherein controlling the one or more dampers comprises modulating the outlet damper to control a volume of exhaust gas injected to the inlet to achieve the EGR injection capacity determined by the processor.

14. The non-transitory computer-readable medium of claim 13, wherein the exhaust recirculation path further comprises an EGR vent disposed between the EGR sensor and the outlet damper, wherein controlling the one or more dampers comprises controlling a vent damper to modulate exhaust gas escape from the EGR system through the EGR vent, and wherein modulating exhaust gas escape is performed based on the volume of exhaust gas injected to the inlet.

15. A method of modulating exhaust gas from an exhaust gas recirculation (EGR) system to heat airflow at an inlet of a compressor of a gas turbine system, the method comprising:
determining an EGR injection capacity for an inlet of a compressor of a gas turbine system based on a sensed operating characteristic of airflow at the inlet, the EGR injection capacity defining a maximum injectable amount of an exhaust gas from an EGR system of the gas turbine system into the inlet of the compressor while maintaining at least a threshold oxidant level at the inlet; and
modulating a position of one or more dampers of the EGR system based on the determined EGR injection capacity to maximize a temperature at the inlet of the compressor while maintaining a part load efficiency within a part load operating threshold and maintaining a base load efficiency within a base load operating threshold.

16. The method of claim 15, wherein the sensed operating characteristic includes one or more of: a temperature, a humidity, a flow rate, or a pressure, and wherein modulating the one or more dampers is further based on sensor data from an EGR sensor disposed along an exhaust recirculation path of the EGR system, wherein the EGR sensor is configured to detect a characteristic of the exhaust gas within the exhaust recirculation path.

17. The method of claim 15, wherein determining the EGR injection capacity comprises inputting the sensed operating characteristics into an adaptive real-time engine simulation.

18. The method of claim 15, wherein determining the EGR injection capacity is performed in further view of maximizing temperature at the inlet while maintaining a part load efficiency within a part load operating threshold and maintaining MECL.

* * * * *